US012539636B2

(12) United States Patent
Lee et al.

(10) Patent No.: US 12,539,636 B2
(45) Date of Patent: Feb. 3, 2026

(54) POWER TRANSMISSION UNIT FOR ELECTRODE CUTTING APPARATUSES

(71) Applicant: LG Energy Solution, Ltd., Seoul (KR)

(72) Inventors: Hyeon Jin Lee, Daejeon (KR); Sin Young Park, Daejeon (KR); Dong Hyeuk Park, Daejeon (KR); Sang Wook Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 393 days.

(21) Appl. No.: 17/922,238

(22) PCT Filed: Jul. 21, 2021

(86) PCT No.: PCT/KR2021/009390
§ 371 (c)(1),
(2) Date: Oct. 28, 2022

(87) PCT Pub. No.: WO2022/019638
PCT Pub. Date: Jan. 27, 2022

(65) Prior Publication Data
US 2023/0173704 A1 Jun. 8, 2023

(30) Foreign Application Priority Data
Jul. 24, 2020 (KR) ........................ 10-2020-0092585

(51) Int. Cl.
*B26D 7/26* (2006.01)
*B26D 1/04* (2006.01)

(52) U.S. Cl.
CPC ........... *B26D 7/2614* (2013.01); *B26D 1/045* (2013.01)

(58) Field of Classification Search
CPC .......... B26D 1/085; B26D 1/08; B26D 1/065; B26D 7/26; B26D 7/2614; B26D 7/2628
See application file for complete search history.

(56) References Cited

U.S. PATENT DOCUMENTS 3,726,164 A * 4/1973 Cocquebert .............. B26D 1/06 83/636
5,001,950 A * 3/1991 Fokos .................... B26D 7/265 83/37

FOREIGN PATENT DOCUMENTS

CN 202862258 U 4/2013
GB 1030783 A * 5/1966
GB 1305014 A * 1/1973
JP H06008195 A 1/1994
JP 107011906 Y2 3/1995
(Continued)

OTHER PUBLICATIONS

International Search Report for Application No. PCT/KR2021/009390 mailed Oct. 21, 2021, 2 pages.
(Continued)

*Primary Examiner* — Jennifer S Matthews
(74) *Attorney, Agent, or Firm* — Lerner David LLP

(57) ABSTRACT

A power transmission unit for electrode cutting apparatuses includes a lift block, an upper frame, a connection shaft, and an elastic member. The lift block includes a structure configured to be mounted to a main frame so as to be movable upwards and downwards. An upper cutter holder is mounted to the upper frame and is fixed to an upper cutter configured to cut an electrode sheet. The connection shaft is configured to connect the lift block and the upper frame to each other. The elastic member is located at the upper part of the connection shaft.

12 Claims, 6 Drawing Sheets

(56) References Cited

FOREIGN PATENT DOCUMENTS

| | | | | |
|---|---|---|---|---|
| JP | 2003025136 | A | | 1/2003 |
| JP | 2007030116 | A | | 2/2007 |
| JP | 2008-080436 | A | | 4/2008 |
| JP | 2017164865 | A | | 9/2017 |
| KR | 20050070713 | A | | 7/2005 |
| KR | 20050106324 | A | * | 11/2005 |
| KR | 101106337 | B1 | | 1/2012 |
| KR | 101115299 | B1 | | 3/2012 |
| KR | 20150103904 | A | | 9/2015 |
| KR | 20160049714 | A | | 5/2016 |
| KR | 20160052063 | A | | 5/2016 |
| KR | 20200008254 | A | | 1/2020 |

OTHER PUBLICATIONS

Extended European Search Report including Written Opinion for Application No. 21845909.7 dated Nov. 29, 2023, pp. 1-11.

* cited by examiner

POWER TRANSMISSION UNIT FOR ELECTRODE CUTTING APPARATUSES

CROSS-REFERENCE TO RELATED APPLICATIONS

The present application is a national phase entry under 35 U.S.C. § 371 of International Application No. PCT/KR2021/009390 filed on Jul. 21, 2021, and now published as International Publication No. WO 2022/019638 A1, which claims priority from Korean Patent Application No. 10-2020-0092585 filed on Jul. 24, 2020, all of which are hereby incorporated herein by reference in their entireties.

FIELD

The present invention relates to a power transmission unit for electrode cutting apparatuses, and more particularly to a power transmission unit for electrode cutting apparatuses configured to have a structure in which a lift block, mounted to a main frame so as to be movable upwards and downwards in order to correct parallelism between an upper cutter and a lower cutter configured to cut an electrode sheet, and a connection shaft coupled to an upper frame, to which the upper cutter is fixed, are loosely coupled to each other.

BACKGROUND

A lithium secondary battery, which is capable of being charged and discharged, has been widely used as an energy source for wireless mobile devices or wearable devices, which are worn on bodies, and has also been used as an energy source for electric vehicles and hybrid electric vehicles presented as alternatives to existing gasoline and diesel vehicles, which cause air pollution.

The lithium secondary battery includes an electrode assembly including a stack of a positive electrode plate coated with a positive electrode active material, a negative electrode plate coated with a negative electrode active material, and a separator located between the positive electrode plate and the negative electrode plate, the separator being configured to prevent short circuit, the separator being configured such that lithium ions (Li-ion) are movable therethrough, a battery case configured to receive the electrode assembly, and an electrolytic solution injected into the battery case such that the lithium ions are movable.

In general, the positive electrode plate and the negative electrode plate may be manufactured through a process of coating a long sheet type positive electrode sheet and a long sheet type negative electrode sheet with a positive electrode active material and a negative electrode active material, respectively, drying and rolling the active materials, and cutting the positive electrode sheet and the negative electrode sheet to a predetermined size to manufacture unit electrodes.

A conventional electrode plate cutting apparatus configured to manufacture the unit electrodes includes a feeding unit configured to feed an electrode plate in a state of being seated and a cutter installed at one side of the feeding unit. The cutter is divided into an upper cutter and a lower cutter. Specifically, based on the electrode plate, the upper cutter is fixed to the upper side of the electrode plate and the lower cutter is installed at the lower side of the electrode plate, and the upper cutter is moved downwards or the lower cutter is moved upwards at an electrode plate cutting position. When the electrode plate is fed to the cutting apparatus, therefore, the edge of the upper cutter and the edge of the lower cutter come into contact with each other to cut the electrode plate.

When the cutting process using the upper cutter and the lower cutter is repeatedly performed, however, the edges of the upper cutter and the lower cutter are worn and the edges of the upper cutter and the lower cutter are curved, whereby the electrode plate is cut in the state in which a cut section is not smooth or a burr is generated.

In addition, if installation surfaces of the upper cutter and the lower cutter do not coincide with each other, work must be performed after the cutters are repeatedly ground. In this case, clearance between the upper cutter and the lower cutter is gradually increased due to a decrease in width of the cutters, which causes damage to the edges of the cutters and increases the amount of foreign matter, whereby a defective electrode assembly is produced.

In connection therewith, FIG. 1, which is a side view and a partial enlarged view of a conventional electrode cutting apparatus, shows a portion of an electrode cutting apparatus having a link type assembly structure in which individual components of an upper unit and a lower unit are directly fastened to a main frame step by step.

Referring to FIG. 1, the conventional electrode cutting apparatus uses a system in which an upper cutter 21 and a lower cutter 25 are aligned using side pressure, whereby the upper cutter 21 is inclined due to the side pressure D and a difference in distance between a side pressure axis and an end of the upper cutter 21, and therefore the surface at which the upper cutter 21 and the lower cutter 25 join each other is distorted. Accordingly, the upper cutter 21 is pushed in a direction opposite the side pressure using a headless bolt 15 in order to prevent inclination of the upper cutter.

In addition, a connection shaft 30 configured to connect a lift block 10 and an upper frame 20 to each other is strongly coupled to the lift block 10 by a bolt.

When parallelism tolerance occurs between upward and downward movement of the lift block 10 and upward and downward movement of the upper frame 20, therefore, the upper cutter 21 may be distorted.

In order to solve this problem, a method of minutely adjusting the fastening distance of the headless bolt 15 is used. However, this method is very complicated, takes much time, and provides unsatisfactory results.

As related prior art, Patent Document 1 discloses an electrode plate cutting apparatus including a body unit constituting a body of the cutting apparatus and a cutter unit including an upper cutter and a lower cutter configured to cut an electrode plate and a gap adjustment means configured to automatically adjust a gap between the upper cutter and the lower cutter.

In Patent Document 1, the gap adjustment means configured to automatically adjust the gap between the upper cutter and the lower cutter is provided in order to prevent a problem in that, as the number of cuttings of the electrode plate is increased, the gap between the upper cutter and the lower cutter is increased.

The gap adjustment means is configured to apply pressure to the lower cutter in order to maintain a uniform gap between the lower cutter and the upper cutter and is constituted by an elastic member, such as a spring. However, this patent document does not suggest a method of maintaining parallelism between the upper cutter and the lower cutter.

PRIOR ART DOCUMENT (Patent Document 1) Korean Registered Patent Publication No. 1106337 (Sep. 1, 2012)

SUMMARY OF THE DISCLOSURE

The present invention has been made in view of the above problems, and it is an object of the present invention to provide a power transmission unit for electrode cutting apparatuses including a structure capable of preventing non-uniformity of a cut section of an electrode sheet and reduction in cutting force due to tolerance in clearance between an upper cutter and a lower cutter of an electrode cutting apparatus that occurs as the result of repetitive cutting of the electrode sheet.

In order to accomplish the above object, a power transmission unit for electrode cutting apparatuses according to the present invention includes a lift block including a structure mounted to a main frame so as to be movable upwards and downwards, an upper frame, to which an upper cutter holder having an upper cutter, configured to cut an electrode sheet, fixed thereto is mounted, a connection shaft configured to connect the lift block and the upper frame to each other, and an elastic member located at the upper part of the connection shaft.

In the power transmission unit according to the present invention, the elastic member may be a spring or rubber.

In the power transmission unit according to the present invention, the connection shaft may be inserted and coupled into a recess formed in the upper frame.

In the power transmission unit according to the present invention, the lift block may be provided therein with a recess configured to receive the connection shaft and the elastic member.

In the power transmission unit according to the present invention, the upper frame may be fastened to the lift block by sliding in the state in which the connection shaft is coupled thereto.

In the power transmission unit according to the present invention, the connection shaft may be loosely coupled to the lift block via the elastic member located at the lower part of a fixing screw coupled to the lift block.

In the power transmission unit according to the present invention, the connection shaft may include a first connection shaft and a second connection shaft, a fixing frame fixed to the lift block may be disposed on the first connection shaft and the second connection shaft, and the elastic member may be disposed at the upper part of the fixing frame.

In addition, pressing force and elastic force of the elastic member with respect to the fixing frame may be equally applied to the first connection shaft and the second connection shaft.

In addition, even though parallelism tolerance occurs between upward and downward movement of the upper frame and upward and downward movement of the lift block performed to cut the electrode sheet, straightness of the upward and downward movement of the upper frame may be guaranteed.

In addition, the present invention provides a method of assembling the power transmission unit, the method including (a) preparing a lift block mounted to a main frame, (b) fixing a connection shaft to an upper frame, (c) fastening the upper frame, to which the connection shaft is fixed, to the lift block by sliding, (d) disposing an elastic member at the upper part of the connection shaft through a through-hole of the lift block, and (e) fastening a fixing screw to the through-hole of the lift block to fix the elastic member.

In the method according to the present invention, in step (c), the upper frame may be fastened to the lift block by sliding in the state in which a fixing frame is disposed in a recess formed in the lift block.

As is apparent from the above description, a power transmission unit for electrode cutting apparatuses according to the present invention is configured such that an upper frame and a lift block mounted to a main frame to provide power necessary for upward and downward movement of the upper frame are fastened to each other in the state in which an elastic member is disposed therebetween, whereby the upper frame and the lift block are loosely coupled to each other.

Even though parallelism tolerance occurs between the lift block and the upper frame at the time of upward and downward movement of the lift block and upward and downward movement of the upper frame, therefore, straightness of the upper frame may be guaranteed.

Since the straightness of the upper frame is guaranteed, as described above, it is possible to prevent fluctuation in clearance between an upper cutter and a lower cutter during repetitive cutting of an electrode sheet.

Consequently, the cut section of the electrode sheet may not be curved, no burr may be generated, separation of an electrode mixture layer may be prevented, and high cutting force may be uniformly maintained.

In addition, correction time necessary to maintain parallelism between the upper cutter and the lower cutter may be reduced, whereby productivity may be improved.

DETAILED DESCRIPTION

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but rather means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Embodiments of the present invention will be described in detail with reference to the accompanying drawings.

Figure 2:
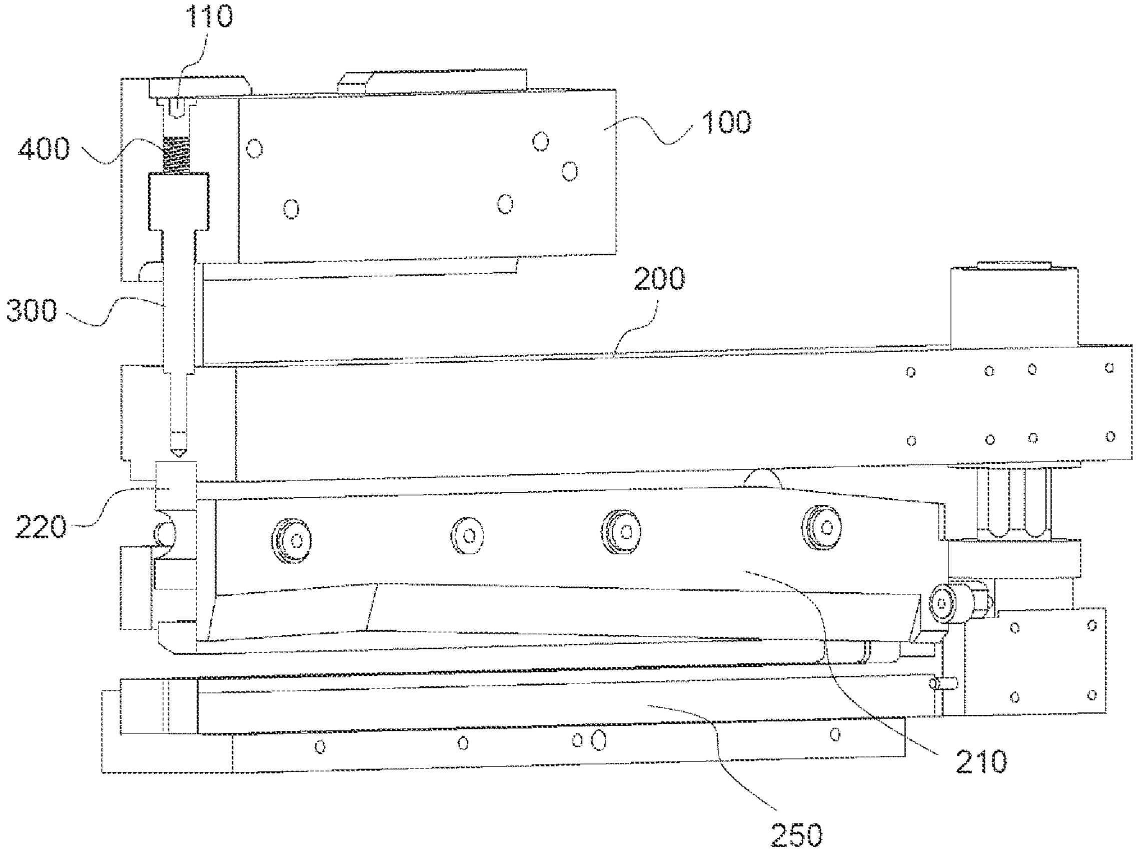
FIG. 2 is a cross-sectional perspective view of a power transmission unit for electrode cutting apparatuses according to an embodiment.
Figure 3:
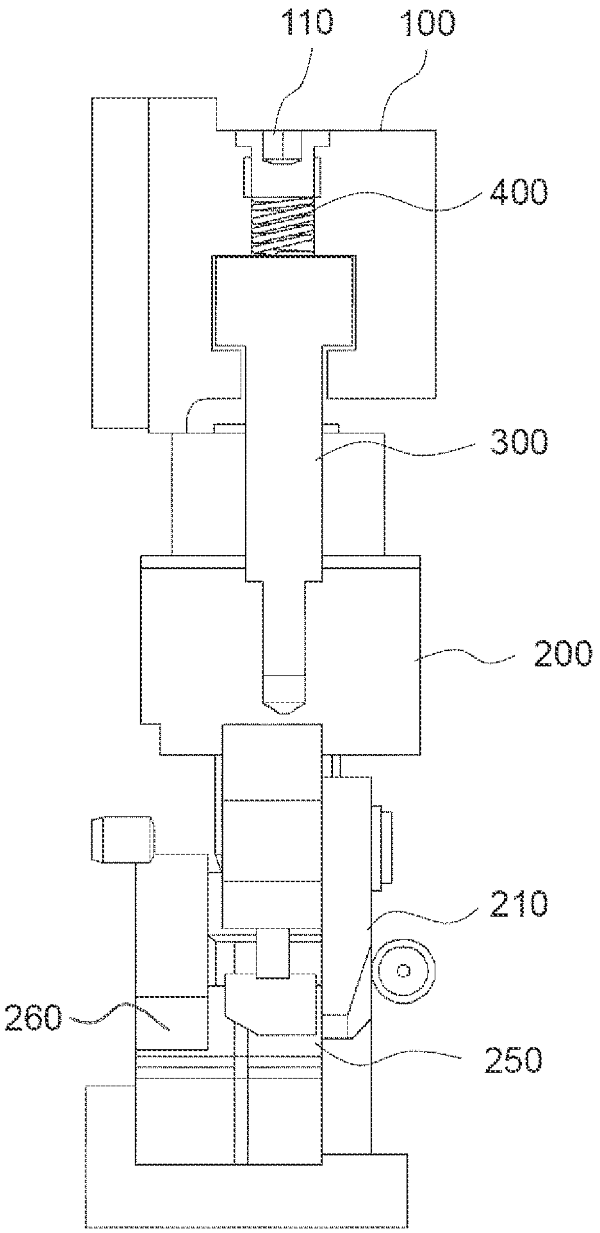
FIG. 3 is a side view of the power transmission unit of FIG. 2.

FIG. 2 is a sectional perspective view of a power transmission unit for electrode cutting apparatuses according to an embodiment, and FIG. 3 is a side view of the unit of FIG. 2.

Referring to FIGS. 2 and 3, the power transmission unit for electrode cutting apparatuses includes a lift block 100 including a structure mounted to a main frame (not shown) so as to be movable upwards and downwards, an upper frame 200, to which an upper cutter holder 220 having an upper cutter 210, configured to cut an electrode sheet, fixed thereto is mounted, a connection shaft 300 configured to connect the lift block 100 and the upper frame 200 to each other, and an elastic member 400 located at the upper part of the connection shaft 300.

When an electrode sheet is fed by a feeding roller, the main frame is synchronized with feeding speed of the electrode sheet and is moved in a feeding direction of the electrode sheet. When relative speed between the main frame and the electrode sheet in the feeding direction becomes 0, the upper frame is moved upwards and downwards to cut the electrode sheet.

Subsequently, when the main frame returns to a work start position, 1 cycle is completed, and the electrode sheet is cut while the cycle is repeated.

The lift block 100 is provided therein with a recess configured to receive the connection shaft 300 and the elastic member 400. The upper frame 200 may be coupled to the recess formed in the lift block 100 by sliding fastening in the state in which the connection shaft 300 is coupled thereto in a state of being integrally coupled to a lower frame 260, to which a lower cutter 250 is mounted.

Consequently, the upper frame and the lower frame may be easily mounted to an electrode cutting apparatus.

The elastic member 400 is located at the upper part of the connection shaft 300 inserted into the recess formed in the lift block 100 and at the lower part of a fixing screw 110 coupled to the lift block 100, and has a height sufficient to be contracted in the recess by insertion of the fixing screw.

Consequently, power resulting from upward and downward movement of the lift block may be transmitted to the upper frame via the elastic member and the connection shaft. In the power transmission unit for electrode cutting apparatuses, however, the elastic member is provided in the upper frame, and therefore the lift block and the connection shaft are loosely coupled to each other.

For example, even though a movement axis along which the lift block moves upwards and downwards deviates from an initially set position, whereby parallelism tolerance occurs between the upward and downward movement of the upper frame and the upward and downward movement of the lift block performed to cut the electrode sheet, such a change less affects the upward and downward movement of the upper frame. Consequently, straightness of the upward and downward movement of the upper frame is guaranteed, whereby it is possible to prevent a change in clearance and parallelism between the upper cutter and the lower cutter that are sophisticatedly set at an initial stage.

The elastic member is mounted in the recess of the lift block so as to allow a gap between the lift block and the connection shaft to some extent. For example, a spring or rubber may be used as the elastic member.

Figure 4:
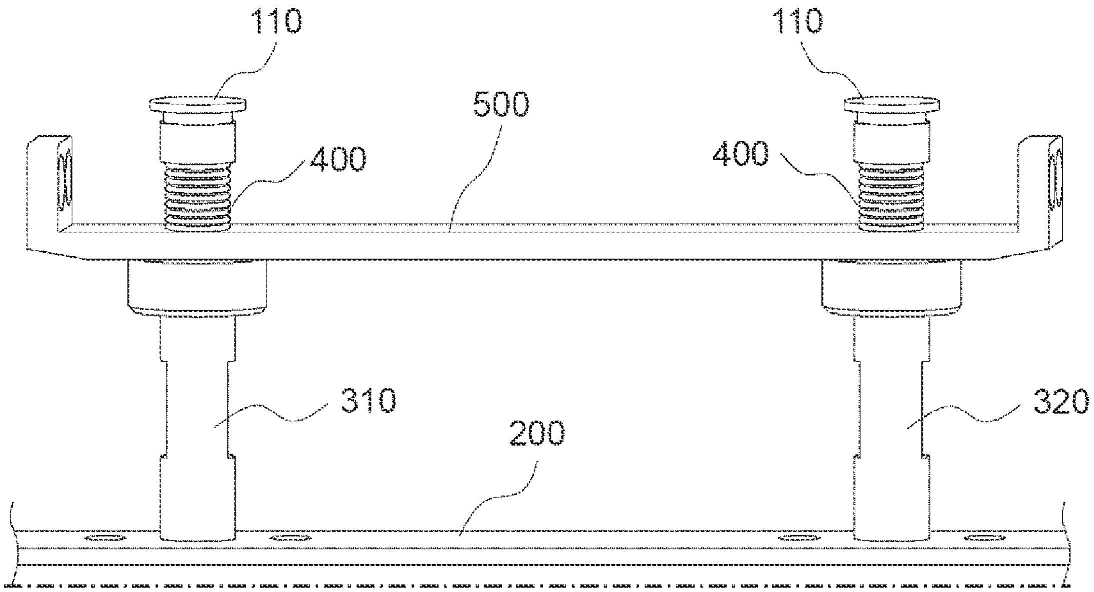
FIG. 4 is a perspective view of a portion of the power transmission unit of FIG. 2 for electrode cutting apparatuses.
Figure 5:
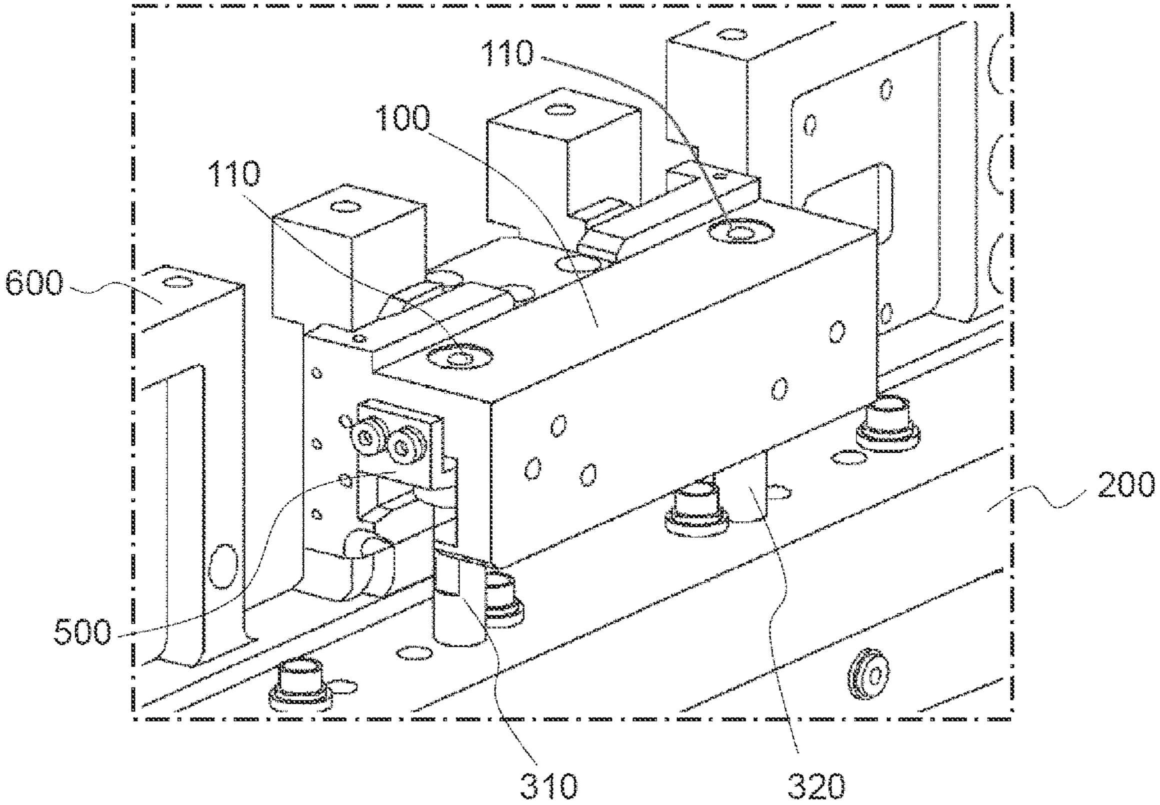
FIG. 5 is a partial perspective view showing the power transmission unit for electrode cutting apparatuses of FIG. 2 in a state in which the unit is mounted to a main frame.

FIG. 4 is a perspective view of a portion of the power transmission unit for electrode cutting apparatuses, and FIG. 5 is a partial perspective view showing the state in which the power transmission unit for electrode cutting apparatuses is mounted to the main frame 600.

Referring to FIG. 4, two connection shafts, i.e. a first connection shaft 310 and a second connection shaft 320, are connected to the upper frame 200, and the first connection shaft 310 and the second connection shaft 320 are disposed spaced apart from each other.

A fixing frame 500 fixed to the lift block 100 is disposed on the first connection shaft 310 and the second connection shaft 320, and the elastic member 400 disposed at the upper part of the fixing frame 500 is fixed by the fixing screw 110 fastened to the lift block 100.

In this structure, pressing force and elastic force of the elastic member 400 with respect to the fixing frame 500 are equally applied to the first connection shaft 310 and the second connection shaft 320.

A method of assembling a power transmission unit for electrode cutting apparatuses according to an embodiment includes (a) a step of preparing a lift block mounted to a main frame, (b) a step of fixing a connection shaft to an upper frame, (c) a step of fastening the upper frame, to which the connection shaft is fixed, to the lift block by sliding, (d) a step of disposing an elastic member at the upper part of the connection shaft through a through-hole of the lift block, and (e) a step of fastening a fixing screw to the through-hole of the lift block to fix the elastic member.

The connection shaft is coupled to the upper frame such that the coupling angle of the connection shaft with respect to the upper surface of the upper frame is a right angle within a precise tolerance allowance range.

Also, in step (c), the upper frame may be fastened to the lift block by sliding in the state in which a fixing frame is disposed in a recess formed in the lift block.

After sliding fastening, a spring, as the elastic member, may be inserted into the through-hole of the lift block, and the fixing screw may be fastened to the through-hole of the lift block in order to fix the spring.

Hereinafter, the present invention will be described with reference to the following example, which is provided for easier understanding of the present invention, and the category of the present invention is not limited thereto.

COMPARATIVE EXAMPLE

Figure 1:
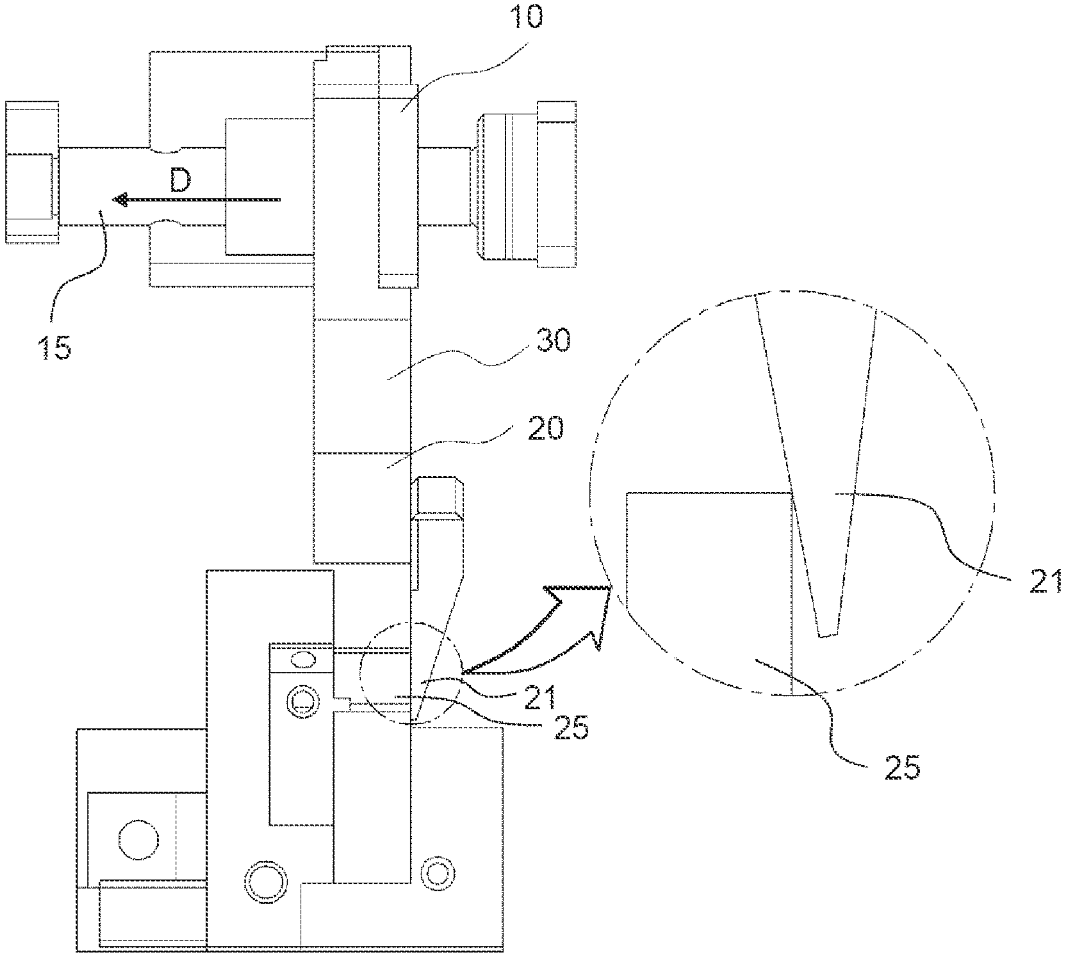
FIG. 1 (PRIOR ART)
FIG. 1 is a side view and a partial enlarged view of a conventional electrode cutting apparatus.

An electrode sheet was cut using a power transmission unit for electrode cutting apparatuses configured such that a connection shaft configured to connect a lift block and an upper frame to each other is strongly coupled to the lift block via a bolt as the electrode cutting apparatus shown in FIG. 1.

Figure 6:
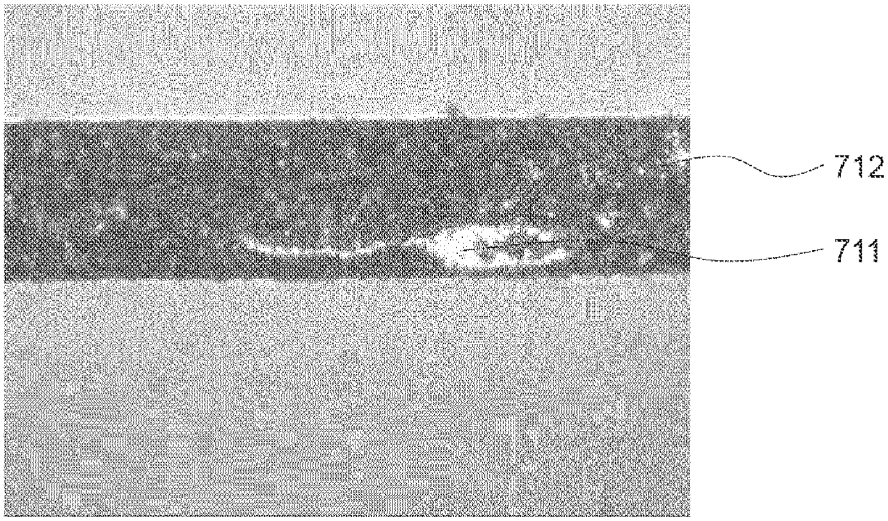
FIG. 6 shows a cut section of an electrode sheet according to Comparative Example.

A cut section of the electrode sheet is shown in FIG. 6.

EXAMPLE

Figure 7:
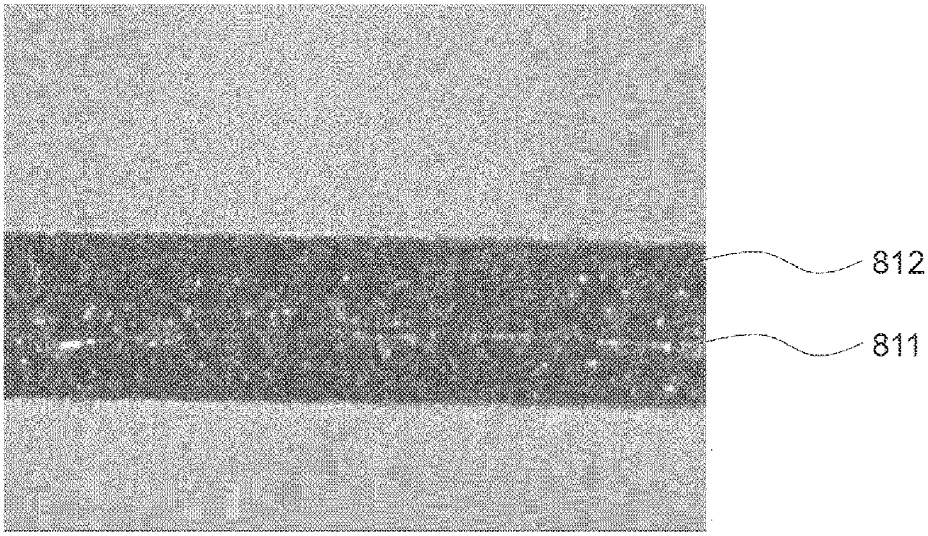
FIG. 7 shows a cut section of an electrode sheet according to Example.

An electrode sheet was cut using the power transmission unit for electrode cutting apparatuses according to an embodiment, and a cut section of the electrode sheet is shown in FIG. 7.

Referring to FIGS. 6 and 7, an electrode sheet plate 711 was curved and pushed downwards at the cut section of the electrode sheet according to Comparative Example, whereby a burr was generated. An electrode mixture layer 712 was broken, whereby powder was blown, and the cut section of the electrode mixture layer was not smooth.

In contrast, an electrode sheet plate 811 was not curved at the cut section of the electrode sheet according to Example, and the cut section of an electrode mixture layer 812 was smooth.

In the case in which the power transmission unit for electrode cutting apparatuses according to the present invention is used, as described above, it is possible to neatly cut the electrode sheet so as to have a smooth cut section and to prevent separation of the electrode mixture layer.

Those skilled in the art to which the present invention pertains will appreciate that various applications and modifications are possible within the category of the present invention based on the above description.

DESCRIPTION OF REFERENCE SYMBOLS

10, 100: Lift blocks
15: Headless bolt
21, 210: Upper cutters
110: Fixing screw
20, 200: Upper frames
220: Upper cutter holder
25, 250: Lower cutters
260: Lower frame
30, 300: Connection shafts
310: First connection shaft
320: Second connection shaft
400: Elastic member
500: Fixing frame
600: Main frame
711, 811: Electrode sheet plates
712, 812: Electrode mixture layers As is apparent from the above description, a power transmission unit for electrode cutting apparatuses according to the present invention is configured such that an upper frame and a lift block mounted to a main frame to provide power necessary for upward and downward movement of the upper frame are fastened to each other in the state in which an elastic member is disposed therebetween, whereby the upper frame and the lift block are loosely coupled to each other.

Even though parallelism tolerance occurs between the lift block and the upper frame at the time of upward and downward movement of the lift block and upward and downward movement of the upper frame, therefore, straightness of the upper frame may be guaranteed.

Since the straightness of the upper frame is guaranteed, as described above, it is possible to prevent fluctuation in clearance between an upper cutter and a lower cutter during repetitive cutting of an electrode sheet.

Consequently, the cut section of the electrode sheet may not be curved, no burr may be generated, separation of an electrode mixture layer may be prevented, and high cutting force may be uniformly maintained.

In addition, correction time necessary to maintain parallelism between the upper cutter and the lower cutter may be reduced, whereby productivity may be improved.

The invention claimed is:

1. A power transmission unit for electrode cutting apparatuses, the power transmission unit comprising:
- a lift block comprising a structure configured to be mounted to a main frame so as to be movable upwards and downwards;
- an upper frame;
- an upper cutter device mounted to the upper frame and configured to cut an electrode sheet;
- a first connection shaft configured to connect the lift block and the upper frame to each other; and
- an elastic member located at an upper part of the first connection shaft and within the lift block,
- wherein the lift block and the upper frame are fastened to each other in a state in which the elastic member and the first connection shaft are disposed therebetween, whereby the upper frame and the lift block are coupled to each other with a gap therebetween,
- wherein the first connection shaft is coupled to the lift block with a close tolerance in a vertical direction parallel to a vertical movement axis of the lift block relative to a fixed lower cutter device and the first connection shaft is loosely coupled to the lift block by the elastic member, and
- wherein the power transmission unit is configured such that movement of the lift block relative to the fixed lower cutter device along the vertical movement axis produces a corresponding movement of the upper frame in the vertical direction, and such that when the vertical movement axis has a deviation from an initially set position, the deviation is corrected by the elastic member, such that only the movement of the lift block along the vertical movement axis is transmitted to the upper frame and the upper cutter device.

2. The power transmission unit according to claim 1, wherein an elastic member is a spring or rubber.

3. The power transmission unit according to claim 1, wherein the first connection shaft is inserted into and thereby coupled to a recess extending into the upper frame.

4. The power transmission unit according to claim 1, wherein the lift block includes a recess configured to receive the first connection shaft and an elastic member.

5. The power transmission unit according to claim 4, wherein the upper frame is fastened to the lift block by sliding in a state in which the first connection shaft is coupled to the upper frame.

6. The power transmission unit according to claim 1, further comprising a fixing screw coupled to the lift block, wherein the first connection shaft is loosely coupled to the lift block via the elastic member located at a lower part of the fixing screw.

7. The power transmission unit according to claim 1, further comprising a second connection shaft; and
- a fixing frame fixed to the lift block and disposed on the first connection shaft and the second connection shaft,
- wherein the elastic member is disposed at an upper part of the fixing frame.

8. The power transmission unit according to claim 7, wherein a pressing force and an elastic force of the elastic member with respect to the fixing frame are equally applied to the first connection shaft and the second connection shaft.

9. The power transmission unit according to claim 1, wherein the lift block is mounted to the main frame.

10. The power transmission unit according to claim 1, wherein the upper cutter device includes an upper cutter holder and an upper cutter fixed to the holder and configured to cut the electrode sheet.

11. A method of assembling the power transmission unit according to claim 1, the method comprising:

(a) mounting a lift block to a main frame;

(b) fixing a connection shaft to an upper frame;

(c) fastening the upper frame to the lift block by relative sliding between the connection shaft and the lift block;

(d) disposing an elastic member at an upper part of the connection shaft through a through-hole of the lift block; and (e) fastening a fixing screw to the through-hole of the lift block to fix the elastic member to the lift block.

12. The method according to claim 11, wherein the fastening of the upper frame to the lift block by the relative sliding is performed in a state in which a fixing frame is disposed in a recess formed in the lift block.

* * * * *